Jan. 12, 1954     W. M. JAMES     2,665,514
FISH LURE
Filed Nov. 14, 1949
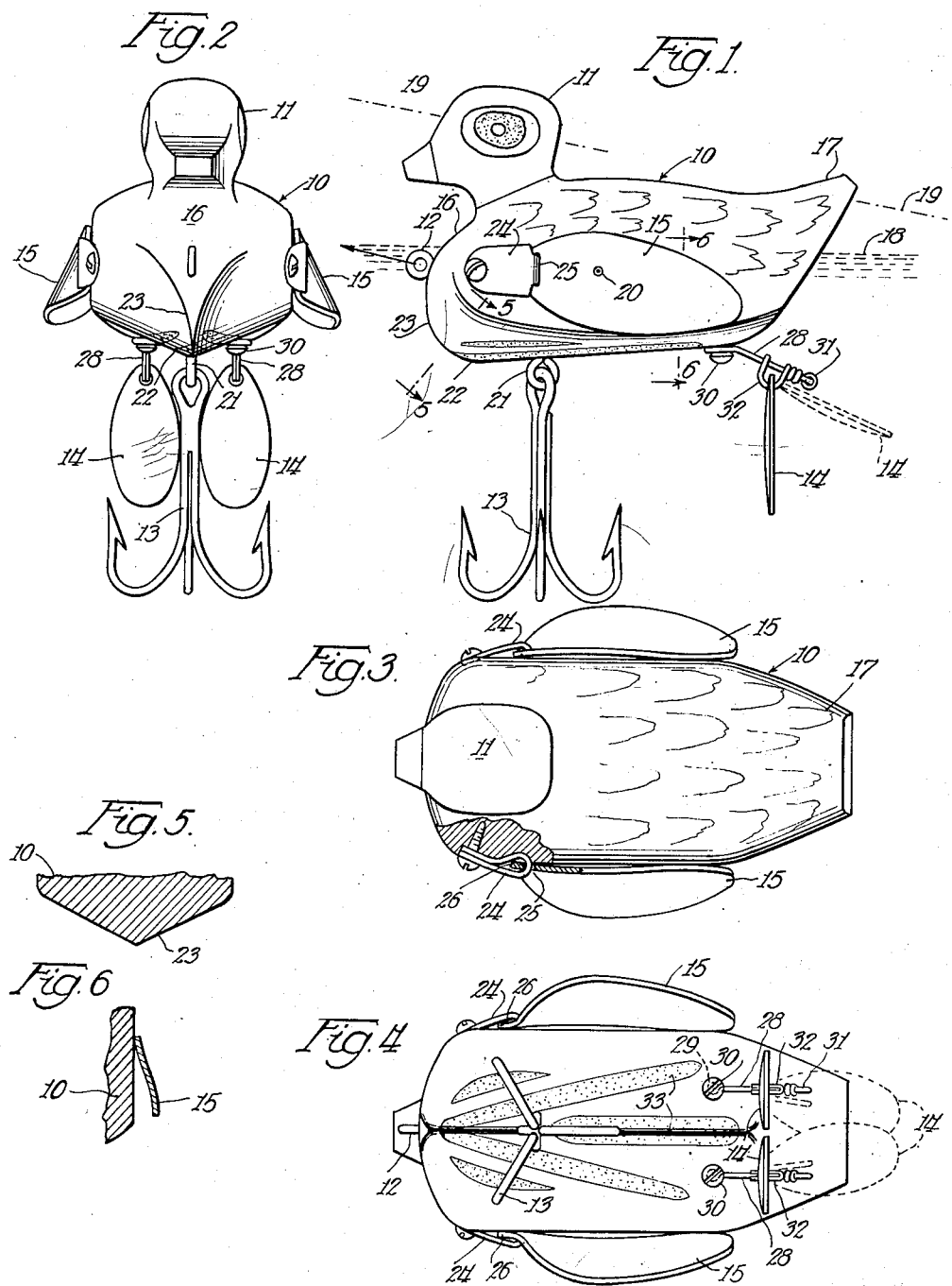
Inventor
William M. James
By: Zabel & Gritzbaugh
Attys.

Patented Jan. 12, 1954

2,665,514

UNITED STATES PATENT OFFICE 2,665,514

FISH LURE

William M. James, Chicago, Ill.

Application November 14, 1949, Serial No. 126,999

1 Claim. (Cl. 43—42.13)

This invention relates to an improved fish lure.

An object of this invention is to provide a fish lure which simulates a duck or duckling in appearance and in its action.

A further object is to provide an improved fish lure which produces visible and audible commotion so as to attract the attention of fish.

Another object is to provide a fish lure which when drawn by a line will be partly submerged so as to simulate a swimming duck and which will be more readily visible to a fish due to its partial submergence, and in this connection the lure is provided with means which tend to limit the depth of submergence.

Still another object is to provide a fish lure which, when a slight jerk is applied to the line will tilt forwardly to simulate the action of a duck as it tips forward to pick up an insect or other object from the surface of the water.

A still further object is to provide an improved fish lure of the type indicated in which means for producing visible and audible commotion are shaped and located in a position to simulate the wings and feet of a duck.

A still further object is to produce a fish lure which will be attractive to muskellunge, northern pike, bass and other fish which prey on ducks and ducklings.

Other objects, features and advantages will become apparent as the description proceeds.

With reference now to the drawings in which like reference numerals designate like parts:

Fig. 1 is an elevation of a preferred embodiment of my invention;

Fig. 2 is a front view thereof;

Fig. 3 is a plan view;

Fig. 4 is a bottom view;

Fig. 5 is a partial section taken along line 5—5 of Fig. 1 showing the shape of a portion of the front surface of the lure, and Fig. 6 is a section taken along line 6—6 of Fig. 1 showing the shape of a wing.

In the drawings, the fish lure comprises a main body portion 10 and a head 11 which together simulate the body and head of a duck. An eye screw 12 projects from the front surface of the body and provides means for attaching a line to the lure. A fish hook 13 depends from the bottom surface of the body. Spinners 14 are disposed at the rear portion of the bottom surface of the body in a position which corresponds generally to the position of the feet of a swimming duck. Wings 15 are mounted on the side surfaces of the body 10. All of the above parts are arranged so as to simulate the appearance of a duck.

The various structural features of the lure cause the operation of the same to simulate the actions of a live duck in swimming partially submerged and in tilting forward to pick objects from the surface of the water. One of these features is the provision of a downwardly and forwardly inclined surface 16 at the front of the duck which acts as an inclined plane to force the duck, or the forward portion thereof, under water when the duck is pulled along by a line attached to the eye screw 12. The lure is also provided with a tail surface 17, which faces generally upwardly and is inclined rearwardly and upwardly, which surface acts as a plane to limit the depth of submergence. The normal water level line is indicated by the reference numeral 18. The water level line when the duck is being pulled is indicated by the reference numeral 19. In operation, as the lure tips forwardly and starts to submerge, due to the reaction of the water on the surface 16, the tail surface 17 being in a plane of substantial lateral extent will be tilted upwardly to a slight extent and as it becomes partially submerged, the water will react against it and tend to tilt the lure backwardly to counteract the effect of the surface 16. Thus a state of equilibrium will be reached.

The hook 13 is secured to the under surface of the lure at a point forwardly of the center of gravity 20 by means of an eye screw 21. This arrangement is believed to contribute to the forward tilting of the duck when a slight jerk is applied to the line. It will be observed from Figs. 2 and 5 that the forward portion 22 of the bottom surface of the lure is V-shaped and the lower front surface 23 of the lure is also V-shaped. This configuration is also believed to contribute to the forward tilting effect and also lends stability against rolling over. The rear portion of the bottom surface may be flat.

Three of the foregoing features, the inclined surface 16, the tail surface 17, and the V-shaped front surface 23, also create visible and audible commotion since they serve to break the water as the lure is pulled forwardly. This is particularly true with respect to the tail surface 17 since, as indicated by the line 19, the middle portion of the duck's back will be submerged, and the tail portion exposed. The tail surface, being flat, will, if the lure is pulled sufficiently rapidly, actually create a substantial spray.

It will be understood that the water level, when the lure is submerged, will vary considerably from that indicated by the reference numeral 19 since it also depends upon the speed with which the lure is pulled.

The wings 15 are attached to the side surfaces of the lure by means of loops 24 formed from strips of metal. As indicated in Fig. 3, the body is recessed to accommodate the loop 24 so that the wing 15 may lie close to the body 10. The forward part of the wing is provided with an aperture 25 through which the loop 24 passes, and forwardly of the aperture is a marginal portion which is adapted to engage the metal of the loop 24 so that the outward motion of the wing will be limited to fifteen or twenty degrees. The provision of the loop 24 also protects the body portion 10 from wear which would otherwise be caused by the movement of the marginal portion 26. The securing means or loops 24 and a substantial portion of the wings 15 are in advance of the center of gravity at 20 and cooperate with the hook 13 to cause tilting of the body in a forward and downward direction.

As shown in the figures, each wing is shaped so that the upper edge, when the wing is in closed position, will lie against the body, while the lower edge is spaced outwardly from the body. The rear portion of the wing is shaped substantially as shown in Fig. 6. This shape of the wings causes them to flutter slowly as the lure idles on the water, thereby creating visible commotion which will attract fish. Also, there will be a clicking caused by the engagement of the marginal portion 26 with the loop 24 which constitutes an audible commotion.

Projecting rearwardly from the bottom surface 10 are two rods 28 which are secured to the body by means of screws 30 which pass through eyes 29 formed at the inner ends of the rods. The outer ends of the rods are suitably headed as indicated by the reference numeral 31. The spinners 14 are secured to the rods 28 by means of U-shaped swivel 32 so that as the lure is dragged through the water the spinners and swivel will rotate about the rods. The spinners 14 are loosely mounted on the swivel 32 so that the spinners while rotating will hit each other, thereby providing an additional source of audible commotion. When this audible commotion is not desired, the rods may be spread apart so that spinners will not interfere with each other. When the lure is being drawn forwardly, the spinners assume the dotted line position shown in Figs. 1 and 4, in which they project backwardly; when the lure is stationary they hang downwardly as shown in the solid line position.

The bottom surface of the lure may be provided with white stripes 33 which simulate pieces of pork rind. These stripes create a visible commotion which has been found to be attractive to fish.

In operation, when the lure is cast, it will land in the water right side up and with the wings open. As the lure is reeled in, the lure will become partly submerged, the tip of the head and the tail breaking the surface of the water so as to create visible and audible commotion. The spinners and wings and the stripes 33 are additional sources of visible commotion, and the spinners and wings also provide audible commotion.

Forward movement of the lure will cause the wings to close and as the forward movement ceases the wings will open. Forward movement also causes a rotation of the spinners.

If the lure is allowed to remain stationary, there will be movement of the wings and of the spinners due to surface currents. A slight tug or jerk on the line will cause the lure to tilt forwardly and dip the beak into the water, simulating the action of the duck.

I claim:

A fish lure comprising an object having a body portion and a head portion substantially having the characteristics of the shape of a duck, said head portion having a neck merging with the body portion, the body portion having an upper surface the rear portion of which curves upwardly and forms a tail end in a plane of substantial lateral extent so as to provide an appreciable water striking surface, the front of the body having substantially midway of the height thereof a securing means for a fishing line and having upwardly and inwardly and downwardly and inwardly inclined surfaces extending from the level of the securing means, a hook secured to the bottom surface of the body in a plane forward of the transverse plane having the center of gravity therein, whereby the object when in water will normally lie in a slight forwardly and downwardly tilted position, securing means on the sides of the body in advance of the center of gravity of the body, and wings pivotally mounted on said securing means and normally extending rearwardly therefrom, said wings being substantially in contact with the side walls of the body, the major portion of the securing means and a substantial portion of the wings cooperating with the hook to cause normal tilting of the body in a forward and downward direction, so that a pull on said fishing line causes a downward movement of the object relative to the surface of the water.

WILLIAM M. JAMES.

References Cited in the file of this patent

UNITED STATES PATENTS

| Number | Name | Date |
| --- | --- | --- |
| 706,941 | Hildebrandt | Aug. 12, 1902 |
| 1,226,701 | Schillinger | May 22, 1917 |
| 1,276,062 | Heddon | Aug. 20, 1918 |
| 1,472,638 | Dickman | Oct. 30, 1923 |
| 1,510,923 | Cosey | Oct. 7, 1924 |
| 1,645,644 | Davenport | Oct. 18, 1927 |
| 1,677,176 | Donaly | July 17, 1928 |
| 2,107,436 | Flanagan | Feb. 8, 1938 |
| 2,162,786 | Oeding | June 20, 1939 |
| 2,457,295 | Woodhead | Dec. 28, 1948 |
| 2,542,622 | Bordner | Feb. 20, 1951 |